(12) United States Patent
Cox

(10) Patent No.: US 7,587,764 B2
(45) Date of Patent: Sep. 8, 2009

(54) CRYPTIC INFORMATION AND BEHAVIOR GENERATION FOR COMPETITIVE ENVIRONMENTS

(76) Inventor: Chadwick James Cox, 2606 Churchill Downs Cir., Chattanooga, TN (US) 37421

(*) Notice: Subject to any disclaimer, the term of this patent is extended or adjusted under 35 U.S.C. 154(b) by 764 days.

(21) Appl. No.: 11/067,353

(22) Filed: Feb. 28, 2005

(65) Prior Publication Data
US 2006/0195903 A1    Aug. 31, 2006

(51) Int. Cl.
*G06F 12/14* (2006.01)
*H04L 9/00* (2006.01)
(52) U.S. Cl. .................... 726/23; 380/44; 713/163
(58) Field of Classification Search .......... None
See application file for complete search history.

(56) References Cited

U.S. PATENT DOCUMENTS 6,782,475 B1 * 8/2004 Sumner ............... 713/163

* cited by examiner

Primary Examiner—Brandon S Hoffman

(57) ABSTRACT

An invention was developed to improve the performance and survivability of units in a competitive environment. Cryptic Command, Control, and Planning, and Management increases to apparent randomness of a plan from an opponent's perspective without increasing the randomness that is apparent to friendly parties. Friendly systems each carry a keyed pseudo-random or chaotic number generating process and a known method for mapping the numbers to behavioral modifications. Since the opponent does not know the key, the sequence, or the mapping, the result from his point of view is increased randomness and degraded predictive capability. Since friendly systems know each other's key, sequence, and mapping, they can predict each other's behavior or generate compatible controls or plans. This improves coordination of friendly units while forcing the opponent to revert to reactive responses rather than maintaining predictive responses. The process is less sensitive to communications degradation than are standard methods of maintaining coordination. This is because communications are only required when elements of the situation change and when these changes are not sensed by all the parties being coordinated.

13 Claims, 10 Drawing Sheets

| Group 1 | | | | Group 2 | | | | Group 3 | | | |
|---|---|---|---|---|---|---|---|---|---|---|---|
| 1 | 2 | 3 | KEY | 1 | 2 | 3 | KEY | 1 | 2 | 3 | KEY |
| 1 | 0 | 0 | K1 | 0 | 1 | 0 | K5 | 0 | 0 | 1 | K7 |
| 1 | 0 | 1 | K4 | 0 | 1 | 1 | K6 | 0 | 1 | 1 | K6 |
| 1 | 1 | 0 | K3 | 1 | 1 | 0 | K3 | 1 | 0 | 1 | K4 |
| 1 | 1 | 1 | K2 | 1 | 1 | 1 | K2 | 1 | 1 | 1 | K2 |

Figure 6

CRYPTIC INFORMATION AND BEHAVIOR GENERATION FOR COMPETITIVE ENVIRONMENTS

CITED REFERENCES

U.S. Pat. No. 6,646,588 "Midair collision avoidance system," Nov. 11, 2003

U.S. Pat. No. 6,604,044 "Method for generating conflict resolutions for air traffic control of free flight operations," Aug. 5, 2003

U.S. Pat. No. 6,640,204 "Method and system for using cooperative game theory to resolve statistical joint effects," Oct. 28, 2003

U.S. Pat. No. 6,579,175 "Game system for occupying a team position in a game area disposed between a plurality of teams," Jun. 17, 2003

U.S. Pat. No. 5,191,341 "System for sea navigation or traffic control/assistance," Mar. 2, 1993

U.S. Pat. No. 5,504,686 "Mission planning costing surface," Apr. 2, 1996

U.S. Pat. No. 4,868,755 "Expert vehicle control system," Sep. 19, 1989

U.S. Pat. No. 6,505,119 "Control unit and mission planning station for a manned paragliding system," Jan. 7, 2003

U.S. Pat. No. 6,122,572 "Autonomous command and control unit for mobile platform," Sep. 19, 2000

U.S. Pat. No. 6,532,454 "Stable adaptive control using critic designs," Mar. 11, 2003

U.S. Pat. No. 6,581,048 "3-brain architecture for an intelligent decision and control system," Jun. 17, 2003

U.S. Pat. No. 6,453,308 "Non-linear dynamic predictive device," Sep. 17, 2002

U.S. Pat. No. 6,625,501 "Kiln thermal and combustion control," Sep. 23, 2003

U.S. Pat. No. 6,498,968 "Optimistic distributed simulation for a UAV flight control system," Dec. 24, 2002

U.S. Pat. No. 6,496,755 "Autonomous multi-platform robot system," Dec. 17, 2002

U.S. Pat. No. 6,611,737 "Advanced Ship Autopilot System," Aug. 26, 2003

U.S. Pat. No. 6,609,119 "Intelligent process control using predictive and patter recognition techniques," Aug. 19, 2003

U.S. Pat. No. 6,642,413 "Process for monitoring a continuous acetic acid and/or methyl acetate production," Nov. 4, 2003.

U.S. Pat. No. 6,373,984 "System and Method for Detecting Patterns or Objects in a Digital Image," Apr. 16, 2002

U.S. Pat. No. 6,067,371 "Method and System for Non-Invasive Temperature Mapping of Tissue," May 23, 2000.

U.S. Pat. No. 5,267,328 "Method for Selecting Distinctive Pattern Information from a Pixel Generated Image", Nov. 30, 1993.

U.S. Pat. No. 5,224,175 "Method for Analyzing a Body Tissue Ultrasound Image," June 1993

U.S. Pat. No. 5,040,225 "Image Analysis Method," August 1991.

U.S. Pat. No. 6,782,475 "Method and Apparatus for Conveying a Private Message to Selected Members," Aug. 24, 2004

U.S. Pat. No. 6,782,473 "Network Encryption System," Aug. 24, 2004.

U.S. Pat. No. 6,782,103 "Cryptographic Key Management," Aug., 24, 2004.

U.S. Pat. No. 6,757,699 "Method and System for Fragmenting and Reconstituting Data," Jun. 29, 2004.

BACKGROUND

1. Field of the Invention

The objective of this invention is to provide a method for command, planning, and management that minimizes the ability of an enemy to gain insight into the command, control, planning, and/or management process yet still allows multiple units to coordinate their actions with substantially reduced communication. (A unit is a single device, robot, cyborg, algorithm, vehicle, person, or process, or a tightly grouped system of devices, robots, cyborgs, algorithms, vehicles, people, or processes.) This approach reduces predictability from the competitor's standpoint while maintaining predictability among friendly units. Frequent exchanges of information are not required, resulting in less communication than standard methods for coordinating assets. This invention was designed with the following goals in mind.

- To ensure that plans, commands, and actions are unpredictable
- To coordinate friendly forces while denying the opponent capability to predict or to anticipate the actions of the friendly forces
- To allow real-time, distributed contingency handling with only brief communication required to describe the changing environment with a-priori identification of potential contingencies not required.
- To increases an opponent's FOG OF WAR, increasing uncertainty and leading to wrong decisions
- To force the opponent into a reactive state to destabilize his Observe-Orient-Decide-Act (OODA) loop [Orr, 1983]
- To improve competitive effectiveness by enhancing force-concentration operations and increasing competitive momentum, thus enabling victory when numerically outnumbered
- To minimize problems of network-centric operations, frequent communication and vulnerability to loss of communication This invention is applicable to the fields of management, command, control, and planning. It has specific applications to military mission planning and to autonomous vehicles. Robots, such as Uninhabited Combat Aerial Vehicles (UCAV), Unmanned Aerial Vehicles (UAV), Unmanned Surface Vehicles (USV), Unmanned Underwater Vehicles (UUV), Unmanned Ground Vehicles (UGV), Unmanned Space Craft (USC), microbots, or nanobots can maximize the benefit of this approach by using advanced computing capabilities. Any activity that includes processes that must be protected from competitive espionage will benefit.

The invention is not an exercise in conventional cryptography. It is not an invention to protect information, such as commands, controls, or plans, after they have been determined. Rather, it is an invention to prevent a competitor or an opponent from predicting or anticipating the commands, controls, and/or plans that will be produced (or that were produced) by a process, algorithm, or device. This makes the invention completely different from standard applications of cryptography.

2. Description of Related Prior Art

While organizations have been trying to hide their actions and motives from enemies for millennia [Sun Szu—"All war is deception."], only in the age of the computer has it become possible to fully exploit the methods described in this application. The word cryptic in the term Cryptic Command, Control, Planning, and Management refers to the intention to make the behavior of a controlled device unpredictable, thus hiding the intentions of the manager, commander, the controller, or the planner. (The controlled device can refer to a robot, a human, or a group of humans and/or robots.)

Cryptic Command, Control, Planning, and Management makes a system unpredictable by incorporating appropriate pseudo-randomness into a management, command, control, or planning strategy. Yet simultaneously, the controlled device is predictable to its comrades. Any friendly system can predict the controlled device's behavior when it has access to the process whereby this pseudorandom strategy is generated. Unfriendly systems cannot predict the system's behavior well because they are not given access to the same information.

This invention has significant degrading effects on any predictive management, command, control, or planning behavior exhibited by unfriendly systems. In the presence of significant uncertainty, a prediction can be very wrong. A wrong prediction will usually lead to an improper response. Actions based upon predictions produce worse results than reactive actions if the uncertainty is large enough. This forces an opponent into reactive behaviors rather than proactive behaviors. Since the opponent is denied the benefits of prediction, he cannot use prediction to compensate for his own process delays.

The coordination of friendly forces is robust to communications failures because it requires little or no communication. The U.S. military is moving to a "network-centric" philosophy of operation that requires a massive communications network. It is a good assumption that this network will come under attack and parts will fail. Our invention provides good coordination even when communications degrade.

Predictability of unmanned systems is an issue that has been ignored by the U.S. Government during the development of command and control architectures for unmanned vehicles. These architectures are evolving standards that will eventually encompass most of the vehicles produced for the U.S. Government [Huang, 2003][JAUS Compliance Specification, 2004][JAUS Inter-Subsystem Compliance Recommendation, 2004][JAUS Domain Model, 2004][JAUS Strategic Plan, 2003][JUSC2, 2004][NATO STANAG 4586] [Portmann, Cooper, Norton, Newborn, 2003][Summey, Rodriguez, DeMartino, Portmann, Moritz, 2001][Wade, 2003][Portmann, 2004][Burke, 2003][Boutelle, 2003] [Riggs, 2003a][Riggs, 2003b]. These documents do not address predictability.

Game theorists have considered uncertainty and predictability in a variety of gaming problems [Dresher, Melvin, 1981]. Their focus has been on forming winning strategies and tactics in the presence of the player's uncertainty without purposely attempting to increase the opponent's uncertainty. Uncertainty has been long considered during the modeling of combat operations. Statistical methods have been applied to develop useful models in the face of battlefield uncertainty [Johnson, Isensee, and Allison, 1995][Ancker, 1995][Yang and Gafarian, 1995][Almeida, Gaver, and Jacobs, 1995] (though deterministic models of combat are still used extensively by warfare analysts [Anderson, 1995] [Anderson and Miercort, 1995][Bitters, 1995][Jaiswal and Nagbhushana, 1995]). These inventions are limited to making statistical predictions of outcomes or to make assessments of the efficacy of a particular force mix or of a particular combat tactic or strategy.

Automated methods have been developed for command, control, and planning [Bartoff, 1999][Rowe and Lewis, 1989] [Zabarankin, Uryasev, and Pardalos, 2000][Proceedings of the AIAA Guidance, Navigation, and Control Conference, 2003]. Some of these methods consider uncertainty and some methods attempt to minimize detectability, but no method attempts to achieve unpredictability from the point of view of an opponent. For example, some methods plan paths for aircraft such that the aircraft present minimal aspect to a radar emitter. In this way, the planners minimize detectability. However, the paths can be predicted if the enemy knows enough.

Command, control, planning, and management processes are traditionally non-cryptic. Unlike a cryptic process, they exhibit the characteristics of (relative) simplicity and determinism. Simplicity is built into a system because of developmental constraints and/or a lack of information. Complexity might be required to deal with all possibilities, but the developers build a process that has just enough complexity to solve the most important problems that might arise. Simplifications are also made because some information required to make the process more capable do not exist or are difficult to obtain. These simplifications make a process more vulnerable to prediction. The ease of prediction is an increasing function of the processes simplicity. The very fact that the process ignores information that is difficult to obtain allows the opponent to ignore the information as well.

Determinism is the degree to which the current state of a process can be predicted from past inputs and outputs. Those people or elements involved in a deterministic process follow a strict set of rules or formulae for arriving at decisions or behaviors. This characteristic is useful because the process can be analyzed by its developers and certain theoretical assurances can be made. Also, a deterministic process is easier to control and to understand by the individuals further up the management or command hierarchy. A non-deterministic process, on the other hand, involves people or elements who make decisions based upon intuition, whim, random chance, or inputs that are unobservable to an opponent. A process that is highly deterministic is also highly predictable if the opponent ascertains or approximates the rules or formulae that govern the production of the process outputs. A non-deterministic process is not easily predicted because the opponent cannot access the intuition, whims, random inputs, or unobservable information that influence the states of the process.

Autonomous processes operate according to deterministic algorithms of constrained complexity. These machines are more vulnerable to the modeling and prediction of an opponent than a human-involved process or vehicle. (But even manned processes can be lured into highly predictable behavior by improper use of predictable planning tools.) Given substantially similar input from an environment, a typical autonomous controller or planner will produce substantially the same behavior. Optimal controllers and planners are the worst in this respect because an opponent does not require any knowledge of the planning process to predict the plans that are produced. This is because an optimal plan is uniquely defined by the inputs to the planner, the constraints of the process, and by the cost function, without regard to the method used to find the minimizing strategy. In most cases, there is only one optimal plan that minimizes a cost function subject to the constraints on the process and subject to a particular set of environmental inputs/conditions. Therefore, if the opponent understands the goals of the people who designed the process or who are using the process, the constraints of the process, and the environmental conditions, the opponent can deduce the plan.

While predictability may seem like a benefit from the point of view of a controls engineer or an industrial planner, it is a grave disability in a competitive environment such as a battlefield. For example, in the movie 'Patton' where George C.

Scott, playing U.S. Army General Patton, excitedly exclaims "Rommel, you magnificent b&$#&%@, I read your book!" when confronted with the actions of General Rommel's Afrika Korps. Because Rommel followed the recommendations of his own book so closely, his battle plan was anticipated by Patton.

Science fiction writers have identified the rigidity of deterministic logic as a weakness of robots. These imaginary robots often lose conflicts with humans because their actions are predictable. The BBC television show 'Dr. Who' presented an episode where two robotic armies were locked in an endless battle. The actions of each side were so optimal as to be precisely predicted by the other side. This resulted in an endless series of moves, countermoves, and counter-counter moves. The war ended in victory for one side only when the time traveling hero introduced randomness into their logic. However, no mention was made of maintaining predictability between the members of that side.

Lawyers have always kept 'books' on their opposing counsels [Halpern, 2004]. In the modem era, these 'books' have grown into considerable databases that are maintained by the claims community. A good 'book' provides insight into strategy that a lawyer will use in the courtroom and during settlement negotiations. Anticipating a lawyer's strategy can save his opponent significant money in settlement or make the difference between winning and losing at trial. However, there is the opportunity for coordinating counsels to communicate adequately; therefore a method such as this invention has never been invented by stake-holders in this 'industry.'

This invention is different from conventional cryptography. To date, cryptography has been limited to protecting information after its generation, usually during its transmittal from a source to a receiver. It does nothing to prevent a competitor from predicting the information that was sent or that will be sent. If the competitor can predict or anticipate the information that is generated by a process, algorithm, or device, he will not need to decrypt the messages. This is an important defect of conventional cryptography. It does no good to encrypt information if the information generating process is sufficiently transparent that the competitor can predict the output of the process.

This deficiency of cryptography is offset somewhat be using various methods of security, thereby preventing the opponent from gaining insight into the information generating process. Such methods include guards, classification guides, secure areas, security boundaries, etc. These methods are effective to some degree but they are vulnerable to espionage. Furthermore, a competitor does not necessarily require knowledge of how a process generates information. If a sufficient set of examples of the resultant information can be intercepted, the competitor can generate a model of the process. This model allows the competitor to predict or to anticipate the information, behaviors, orders, controls, or plans produced by the organizational process, cyborg, robot, or algorithm.

Related Patents

U.S. Pat. No. 6,646,588 "Midair collision avoidance system", Nov. 11, 2003
  The invention described in the patent listed below addresses an important planning problem, determining an aircraft flight path to avoid a potential collision. Like all planning methods, it includes a method for mapping from numbers that describe the environment to planned behaviors. Unlike this method, our invention assumes potential competition and increases the unpredictability in the system from a competitor's point of view.

U.S. Pat. No. 6,604,044 "Method for generating conflict resolutions for air traffic control of free flight operations", Aug. 5, 2003
  This invention is applicable to the same problem as the invention of 6,646,588. It uses prediction to determine a proper response to a conflict between aircraft. Unlike our invention, it makes the assumption that all aircraft are operating with the same goal: avoiding collisions. Unlike this method, our invention assumes potential competition and increases the unpredictability in the system from the competitor's point of view.

U.S. Pat. No. 6,640,204 "Method and system for using cooperative game theory to resolve statistical joint effects", Oct. 28, 2003
  This patent describes an approach to playing a competitive game. It describes the cooperation of friendly players but does not address the confusion of opponents. Unlike this method, our invention increases the unpredictability in the system from a competitor's point of view.

U.S. Pat. No. 6,579,175 "Game system for occupying a team position in a game area disposed between a plurality of teams", Jun. 17, 2003
  This patent describes a method for solving a gaming problem. Like our invention, it assumes a competitive environment and includes a method for mapping from numbers that describe the environment to planned behaviors. It requires frequent communication to maintain the coordination of the friendly players. Unlike this method, our invention confuses the competitors by increasing the apparent unpredictability in the system.

U.S. Pat. No. 5,191,341 "System for sea navigation or traffic control/assistance", Mar. 2, 1993
  This patent describes a method for coordinating the motions of a plurality of ships by mapping known state information to heading and speed commands. Unlike our invention, frequent communication is required to maintain this coordination. Unlike our invention, competition is not addressed.

U.S. Pat. No. 5,504,686 "Mission planning costing surface", Apr. 2, 1996
  This patent describes a method to determine covert flight paths for an aircraft from a space of flyable paths. We have included this reference to distinguish between unpredictability and undetectability. By reducing detectability of the aircraft to radar, this method might lead to the confusion of an opponent, but not if the opponent is capable of predicting the location of the aircraft from an initial observation. This invention does not include any provision for making an aircraft's path unpredictable. If the opponent has some information concerning the aircraft, the mission, and the planning algorithm then prediction of the aircraft's location becomes possible and the opponent will not be surprised. This predictability is typical of all mission planning methods known to the applicant. Our invention addresses the predictability issue by incorporating pseudorandom behaviors.

U.S. Pat. No. 4,868,755 "Expert vehicle control system", Sep. 19, 1989
  This patent addresses mission planning and control. Unlike this invention, our invention addresses a competitive environment and reduces the predictability of the process with respect to the competitors.

U.S. Pat. No. 6,505,119 "Control unit and mission planning station for a manned paragliding system", Jan. 7, 2003
  This patent describes control and mission planning for a para-glider. Unlike this invention, our invention addresses a competitive environment and reduces the predictability of the process with respect to the competitors.

U.S. Pat. No. 6,122,572 "Autonomous command and control unit for mobile platform", Sep. 19, 2000
  This patent describes a method for planning a mission. Unlike this invention, our method addresses a competitive environment and reduces the predictability of the process with respect to the competitors.

U.S. Pat. No. 6,532,454 "Stable adaptive control using critic designs", Mar. 11, 2003

U.S. Pat. No. 6,581,048 "3-brain architecture for an intelligent decision and control system", Jun. 17, 2003

U.S. Pat. No. 6,453,308 "Non-linear dynamic predictive device", Sep. 17, 2002

U.S. Pat. No. 6,625,501 "Kiln thermal and combustion control", Sep. 23, 2003

U.S. Pat. No. 6,498,968 "Optimistic distributed simulation for a UAV flight control system", Dec. 24, 2002

U.S. Pat. No. 6,496,755 "Autonomous multi-platform robot system", Dec. 17, 2002

U.S. Pat. No. 6,611,737 "Advanced Ship Autopilot System", Aug. 26, 2003

U.S. Pat. No. 6,609,119 "Intelligent process control using predictive and patter recognition techniques", Aug. 19, 2003

U.S. Pat. No. 6,642,413 "Process for monitoring a continuous acetic acid and/or methyl acetate production", Nov. 4, 2003
  These patents each describe a control method that uses prediction of the device under control, but does not consider prediction of external devices. Unlike these methods, our invention considers opponents and other cooperating devices. Unlike these methods, our invention makes a controller less predictable from the point of view of the competitors yet allows coordination of multiple friendly devices.

U.S. Pat. No. 6,373,984 "System and Method for Detecting Patterns or Objects in a Digital Image", J. Gouge and S. Gouge, Apr. 16, 2002

U.S. Pat. No. 6,067,371 "Method and System for Non-Invasive Temperature Mapping of Tissue", J. Gouge, et. al. May 23, 2000

U.S. Pat. No. 5,267,328 "Method for Selecting Distinctive Pattern Information from a Pixel Generated Image", J. Gouge, Nov. 30, 1993, (European patent No. 0483299 (12 countries), German patent No. 69129690.1-08, International patent application No. PCT/US91/00441, Australian patent application No. 74963/91)

U.S. Pat. No. 5,224,175 "Method for Analyzing a Body Tissue Ultrasound Image", J. Gouge, June 1993, (European Patent Application No. 91909714.7, International Patent Application No. PCT/US91/03083).

U.S. Pat. No. 5,040,225 "Image Analysis Method", J. Gouge, August, 1991
  These patents clearly discriminate between deterministic, random, and pseudorandom processes. However, none of these patented technologies are methods for purposefully making a process, algorithm, or device unpredictable.

U.S. Pat. No. 6,782,475 "Method and Apparatus for Conveying a Private Message to Selected Members", Terance Sumner, Aug. 24, 2004

U.S. Pat. No. 6,782,473 "Network Encryption System", Minn Soo Park, Aug. 24, 2004

U.S. Pat. No. 6,782,103 "Cryptographic Key Management", R. D. Arthan, A. J. Robinson and T. A. Parker, Aug., 24, 2004

U.S. Pat. No. 6,757,699 "Method and System for Fragmenting and Reconstituting Data", Lowry and Douglas, Jun. 29, 2004
  These patents are typical of those that refer to encryption of data. They protect data via a keyed process. However, none of these patents described methods for protecting the data generating process itself from prediction.

Additional References

Almeida, R., D. P. Gaver, and P. A. Jacobs. (1995.) "Simple Probability Models for Assessing the Value of Information in Defense Against Missile Attack," In *Warfare Modeling*, J. Bracken, M. Kress, and R. Rosenthal, Eds., John Wiley and Sons, Danvers, Mass.

Ancker, C. J. (1995.) "A Proposed Foundation for a Theory of Combat," In *Warfare Modeling*, J. Bracken, M. Kress, and R. Rosenthal, Eds., John Wiley and Sons, Danvers, Mass.

Anderson, L. B. (1995.) "Attrition Formulas for Deterministic Models of Large Scale Combat," In *Warfare Modeling*, J. Bracken, M. Kress, and R. Rosenthal, Eds., John Wiley and Sons, Danvers, Mass.

Anderson, L. B. and F. A. Miercort. (1995.) "On Weapons Scores and Force Strengths," In *Warfare Modeling*, J. Bracken, M. Kress, and R. Rosenthal, Eds., John Wiley and Sons, Danvers, Mass.

Bartoff, S. A. (1999.) "Path Planning for Unmanned Air Vehicles," http://www.va.afrl.af.mil/DIV/VAC/VACA/pubs/asc-99-2425.pdf.

Bitters, D. L. (1995.) "Efficient Concentration of Forces, or How to Fight Outnumbered and Win,"," In *Warfare Modeling*, J. Bracken, M. Kress, and R. Rosenthal, Eds., John Wiley and Sons, Danvers, Mass.

Boutelle, Steven. (2003.) "Command, Control, Communications, and Computers for Support of the Objective Force." AUSA/AAAA Aviation Symposium, January.

Burke, John D. (2003.) "Unmanned Aerial Vehicle Systems," AUSA/AAAA Aviation Symposium, January.

Dresher, Melvin. (1981.) *The Mathematics of Games of Strategy*, New York, N.Y.: Dover Publications.

Franklin, Powell, and Emami-Naeini. (1994.) *Feedback Control of Dynamical Systems*, Third Edition, Reading, Mass.: Addison-Wesley.

Halpern, R. G. (2004.Z) "Rommel you magnificent bastard, I read your book!," hppt://www.halperngroup.com/Archive/rommel.htm.

Huang, Hui. (2003.) "Autonomy Levels for Unmanned Systems (ALFUS)," Presentation to JAUS Working Group Meeting. Aug. 14. Mr. Huang is with the Intelligent Systems Division, National Institute of Standards and Technology, U.S. Department of Commerce.

Jaiswal, N. K. and B. S. Nagabhushana. (1995.) "Termination Decision Rules in Combat Attrition Models," In *Warfare Modeling*, J. Bracken, M. Kress, and R. Rosenthal, Eds., John Wiley and Sons, Danvers, Mass.

*JAUS Compliance Specification* (JCS). (2004.) Version 1.0 (Draft). 18 May.

*JAUS Inter-Subsystem Compliance Recommendation*. (2004.) 14 January.

*JAUS Domain Model*. (2004.) Volume I. Version 3.2 (Draft). 09 April.

*JAUS Strategic Plan*. (2003.) Version 1.3. July 25.

*Joint Unmanned Systems Common Control (JUSC2) Advanced Concept Technology Demonstration*, (2004.) Preliminary Draft, Rev 1, 8 Jun. Produced by the JUSC2 Working Group led by Helmut Portmann, Naval Surface Warfare Center, Panama City (NSWC-PC), U.S. Navy.

Johnson, R. E., E. K. Isensee, and W. T. Allison. (1995.) "A Stochastic Version of the Concepts Evaluation Model (CEM)," In *Warfare Modeling*, J. Bracken, M. Kress, and R. Rosenthal, Eds., John Wiley and Sons, Danvers, Mass.

NATO Standards Agreement (STANAG) 4586. Standard for UAV Systems Interoperability. Orr, George. (1983.) *Combat Operations C3I: Fundamentals and Interactions*. Air Power Research Institute. Air University Press: Maxwell Air Force Base, AL. U.S. Government Printing Office.

Portmann, Helmut, Ed. (2004.) *Joint Unmanned Systems Common Control (JUSC2) Advanced Concept Technology Demonstration Technical Manager Requirements Document*. Preliminary draft., Rev 1, June. 8.

Portmann, Cooper, Norton, Newborn. (2003.) "Unmanned Surface Vessels: Past, Present, and Future," At http://www.globalatlantic.com/unmanned.html. Mr. Portman is with the U.S. Navy at the Naval Surface Warfare Center, Panama City.

Riggs, John M. (2003a.) "Army Aviation in the Objective Force," AUSA/AAAA Aviation Symposium, January.

Riggs, J. M.(2003b.) "Building an Army . . . FCS as Part of the Objective Force," A USA/AAAA Aviation Symposium, January.

Rowe, N. C. and D. H. Lewis. (1989.) "Vehicle Path Planning in Three-Dimensional Space Using Optics Analogs for Optimizing Visibility and Energy Cost," *Proceedings of the NASA Conference of Space Telerobotics*, Pasadena, Calif., January. Also at http://www.cs.nps.navy.mil/people/faculty/rowe/spacesymp.html.

Proceedings of the American Institute of Aeronautics and Astronautics (*AIAA*) *Guidance, Navigation, and Control Conference, Austin, Tex.*, 11-14 Aug.

Summey, D. C., R. R. Rodriguez, D. P. DeMartino, H. H. Portmann, and E. Moritz. (2001.) *Naval Readiness Augmentation: A Concept for Unmanned Systems in the Navy*. CSS/TR-01/04. U.S. Navy: Coastal Systems Station, Code R 10, June.

Sun Szu. (date uncertain) "The Art of War"

Wade, R., R. Ernst, and S. Daniel. (2003.) "An Overview and Comparison of Unmanned Systems Standards," Presentation to JAUS Working Group Meeting. Aug. 14. (Wade: 256-842-6174, robert.wade@sed.redstone.army.mil; Ernst: NAVSEA Panama City, 850-235-5301, ernstrm@ncsc.navy.mil; Daniel: PMA 263 , 301-757-5864, daniels1@(navair.navy.mil)

Yang, J. and A. V. Gafarian. (1995.) "A Fast Approximation of Homogeneous Stochastic Combat," In *Warfare Modeling*, J. Bracken, M. Kress, and R. Rosenthal, Eds., John Wiley and Sons, Danvers, Mass.

Youngren, M. A, Series editor. (1994.) *Military Operations Research Analyst's Handbook*. Published by the Military Operations Research Society.

Zabarankin, M., Stan Uryasev, and P. Pardalos. (2000.) "Optimal Risk Path Algorithms," Workshop on Cooperative Control and Optimization, December.

SUMMARY OF THE INVENTION

This approach improves the performance and survivability of units in a competitive environment. This approach reduces predictability from the competitor's standpoint while maintaining predictability and coordination from the point of view of friendly units. This invention requires much less communication than traditional methods of coordination and replanning. The concept will revolutionize the way that control engineers view the design of algorithms for systems that operate in competitive environments. This invention initiates a new branch of intelligent systems theory called Cryptic Command, Control, Planning, and Management.

To increase the apparent randomness of a plan from the opponent's perspective without increasing the randomness that is apparent to friendly forces, friendly systems each carry a keyed pseudo-random or chaotic number generating process and a known method for mapping the numbers to behaviors. Since the opponent does not know the key, the sequence or the mapping, the result from his point of view is increased randomness and degraded predictive capability. Since friendly systems know each other's key, sequence, and mapping, they can predict each other's behavior or generate compatible controls or plans. This improves coordination of friendly units while forcing the opponent to revert to reactive responses rather than to predictive responses. The process is robust to communication loss because frequent communication is not required.

Consider a single, friendly vehicle where a choice must be made (FIG. 1). For this example, we limit all motion to two dimensions. This vehicle can go around the obstacle to the right or to the left. The enemy has a good probability of successfully attacking only if he can be in the proper place when the friendly goes around the obstacle. To ensure proper placement, he must predict the behavior of the friendly vehicle. If the friendly vehicle is completely predictable (e.g. he always breaks right, a la "Hunt for Red October"), the enemy will be in the correct position. If the friendly is completely unpredictable, the enemy will only be in the correct position with 50% probability. Furthermore, if the enemy command must ration its resources to various tasks then it must know when the friendly is coming, lest a resource be wasted by always sitting in a fixed position, even when it is not needed there. In this case, the chance of being in the right place at the right time is much reduced.

Now consider the case where there are many choices. (FIG. 2) One can see that being in the right place at the right time becomes unlikely. In fact, as the choices available to the friendly increase, the likelihood that the enemy will be in the appropriate position at the appropriate time decreases. To respond effectively, the enemy must mount a superior counter to the friendly threat. This may mean allocating additional enemy vehicles or allocating a vehicle with superior weaponry and/or speed.

Now consider the case where there are many obstacles, many friendly vehicles, and a single, waiting enemy. (FIG. 3) One option is that all the friendly vehicles will go around the same side of the same obstacle. In this way, the enemy will have the minimal chance of engaging the friendly vehicles. However, if the enemy does engage the friendly vehicles, friendly losses may be greater since more vehicles will be exposed to the threat. On the other hand, all but two friendly vehicles may follow a different route. In this case, the probability that the enemy will engage at least one friendly vehicle is 50%. The problem for the friendly vehicles is to select the least risky set of paths. The total risk is some function of the probability of engagement and the number of friendlies involved in each potential engagement. A centralized planner can solve this problem; however, centralization presumes good communication as well as other drawbacks. A decentralized planner would give each friendly vehicle responsibility for selecting its own path. However, each path must be coordinated with the others. This means either good communication is necessary or that some sort of expectations (rules) must be enforced. Ordinarily, rules imply predictability, but the invention saves the day by adding an element of pseudo-randomness. The enemy cannot know where the greatest concentration of friendly vehicles will pass.

BRIEF DESCRIPTION OF THE DRAWINGS

FIG. 6 shows a table of coordination keys for a three party system

DESCRIPTION OF THE PREFERRED EMBODIMENT

Figure 1:
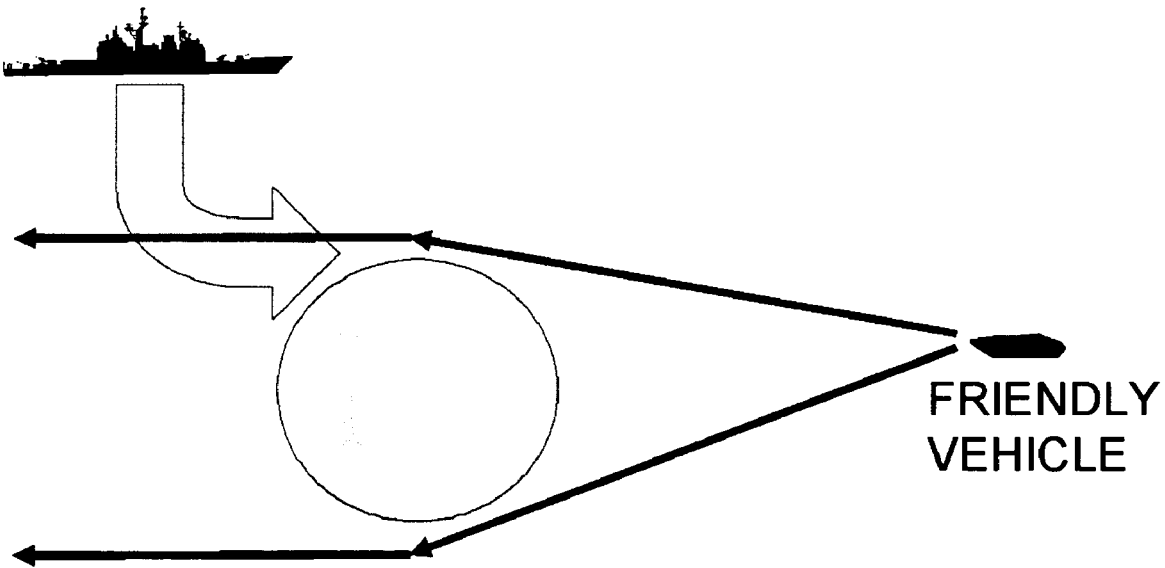
FIG. 1 is a an example with a single friendly vehicle, a single opponent, and a single obstacle
Figure 2:
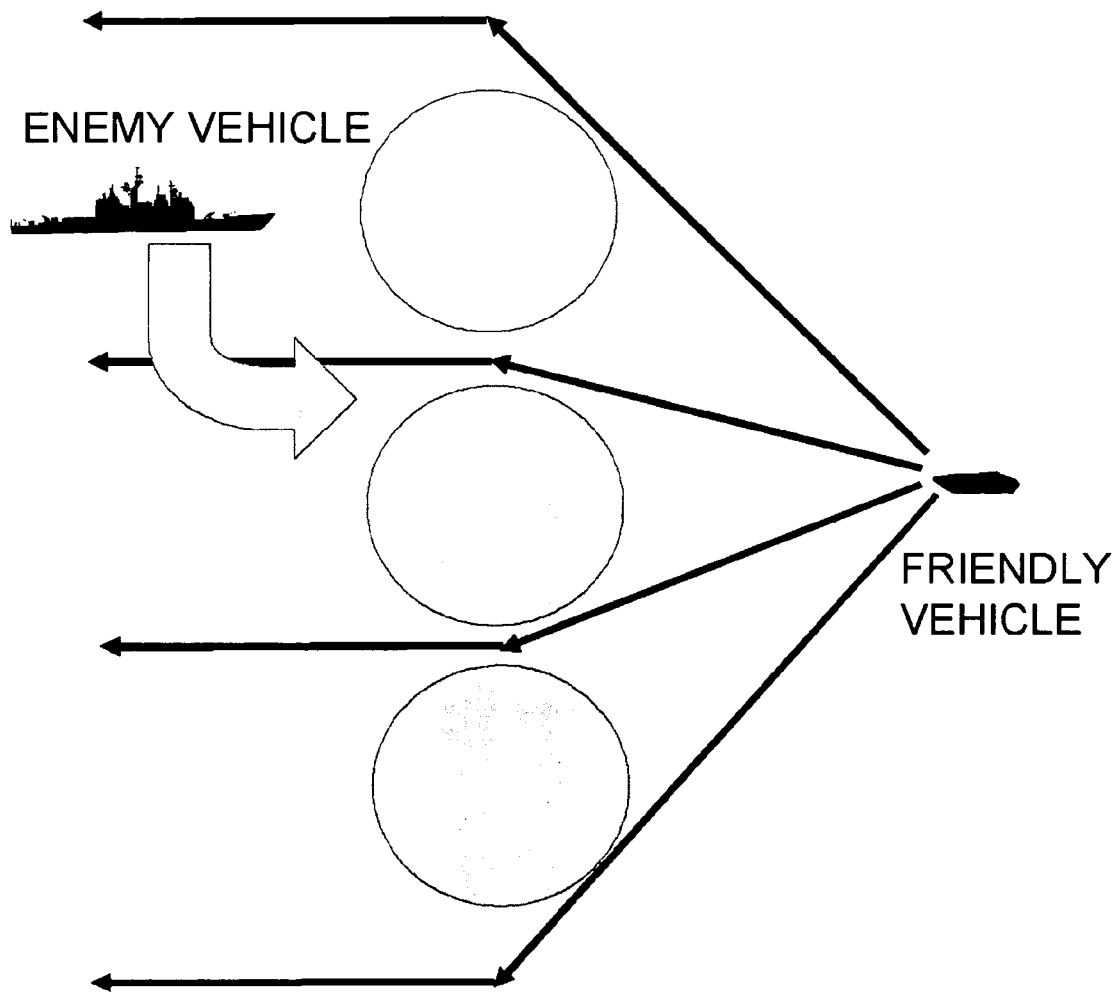
FIG. 2 is a an example with a single friendly vehicle, a single opponent, and many obstacles
Figure 3:
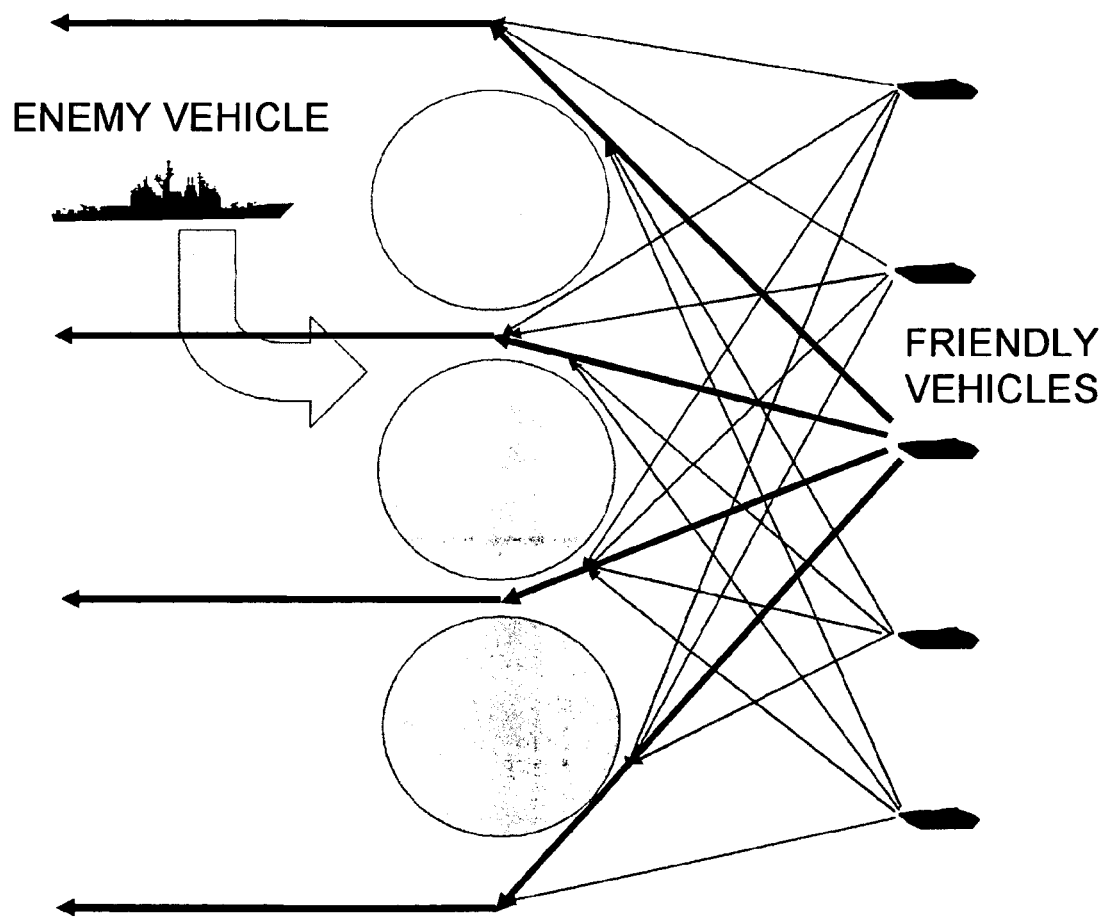
FIG. 3 is a an example with many friendly vehicles, a single opponent, and many obstacles
Figure 4:
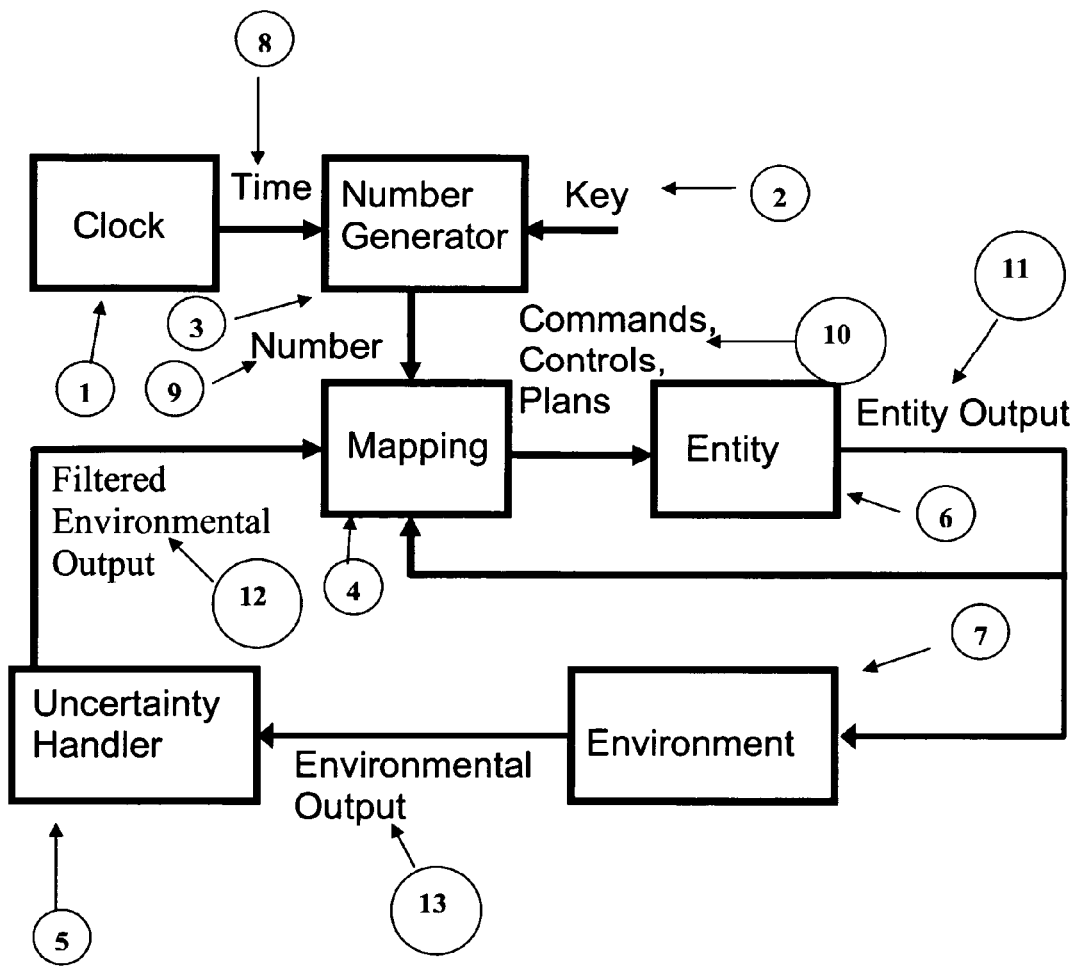
FIG. 4 is a block diagram of the cryptic command, control, or planning process.

The preferred embodiment of a cryptically commanded, controlled, or planned system has the following components. The relationships between these parts are shown in FIG. 4.

Clock (1)

Key (2)

A pseudo-random number generator and/or a chaotic number generator (3)

Mapping from numbers to information or behaviors (4)

This mapping may be a function of external entity outputs, environmental variables, process state variables, predictions, uncertainty estimates, or other information.

Uncertainty handler (5)

An Entity, the device that is directed by commands, controls, or plans (6)

Environment (7)

This includes objects such as opponent forces, friendly forces, and neutral entities as well as targets, obstacles, weather, and constraints (such as rules of engagement or no fly-zones).

Each coordinating Entity (6) is associated with a device with the structure shown in FIG. 4. The Number Generator (3) receives a Key (2) and the Time (8) from a Clock (1). The Number Generator (3) may be a pseudorandom number generator or a chaotic process. If the Number Generator (3) is a pseudorandom number generator, the time and the key are combined to form what is know to those skilled in the art as a "seed." If the Number Generator (3) is a chaotic process then the time and the key combine to form an initial condition. A sequence of Numbers (9) is passed to the Mapping (4) as they are needed. The Mapping (4) is a function or algorithm that evaluates the Filtered Environmental Output (12) and determines a Command, a Control, or a Plan (10). The Command, Control, or plan (1) is passed to an Entity (6). The Entity (6) follows the Command, Control, or Plan (11) to produce some Entity Output (11) which operates on the Environment (7). The Environment (7) includes everything that is external to the Entity (6). The Environment (7) responds to this Entity Output (11) and to other factors to produce the Environmental Output (13). From the perspective of each Entity (6), information characterizing other coordinating entities is part of the Environmental Output (13). The Uncertainty Handler (5) observes the Environmental Output (13) and produces a Filtered Environmental Output (12). This Filtered Environmental Output (12) is a biased and/or discretized version of the Environmental Output (13) such that the Mappings (4) of the coordinating Entities (6) are made insensitive to uncertainty. Alternatively, the Uncertainty Handler (5) can be built directly into the Mapping (4).

Please note that the Clock (1) is not an absolute requirement, but its use provides an easy way to generate different behaviors at different times while synchronizing friendly entities in time. The Uncertainty Handler (5) is only required where the coordinating units have differing information characterizing the Environmental Output (12).

Since all friendly systems have synchronized Clocks (1), access to an identical Number Generator (3), the same Uncertainty Handler (5), and a coordinated Mapping (4), they can account for the apparent randomness of each other's actions. Since unfriendly agents do not have this information, the pseudorandom behavior of the friendly systems serves to reduce the performance of any predictor that the unfriendly agents might use to determine the future outputs or actions of the friendly systems. Unfriendly tracking performance will also degrade. An opponent must have information about all of these components to properly predict the information or behaviors that are produced by the process. Precise information is only required with respect to the Key (2) and the Number Generator (3). All other information can be imprecisely known, though additional precision will result in better predictions. Even if all details of the system are compromised, the Key (2) can be changed to maintain unpredictability.

The elements of a cryptic control system can be highly automated or simple and manual. The Clock (1) can be the GPS system. It can be as mundane as a quartz clock. The Clock (1) can also be as simple as a sensor that views the position of the sun or the stars. This sensor might even be a human eye. The Number Generator (3) can consist of a long list of numbers in a computer's memory or it can be a list of numbers in a war fighter's codebook or on the back of his hand. The Mapping (4) between the numbers and perturbations to actions can be a highly complex computer algorithm or a simple set of rules. Therefore, this approach can be applied to the most sophisticated autonomous vehicles or to human war fighters. (Though the limitations described previously still apply.) The Uncertainty Handler (5) allows units to coordinate their behavior or to predict the behavior of other units despite the fact that each unit has a differing view of the situation. For example, one unit might sense the position of an obstacle as x+e1 and another unit might sense the position of the obstacle as x+e2. If unit one uses x+e1 to generate its own behavior and unit two uses x+e2 to predict the behavior of unit one then the prediction may be wrong. There are two ways to handle this uncertainty. The first is to desensitize the behavior forming process to uncertainty. The second way is to bias each unit towards producing deterministic behaviors.

The first way to ensure that the Entity's (6) behavior is predictable to friendly units is to estimate the uncertainty involved in each decision. Uncertain quantities can be biased or discretized so that decisions are insensitive to the expected level of uncertainty. An example is a decision made with a simple rule.

If A>B then do C

If A has an uncertainty bound of +/−a and B has an uncertainty bound of +/−b, where a and b are positive quantities, the rule can be made insensitive to the uncertainty by modifying it as follows.

If A−a>B+b then do C

The uncertain variables A and B are replaced with A−a and B+b by the Uncertainty Handler (5). Only in the case that A exceeds B by the maximum total uncertainty, a+b, will the rule be executed. This rule also can be changed by modifying the variables so that C is always performed when A is in the uncertain region.

If A<B+a+b AND A>B−a−b then do C

If a pseudorandom number is added to a variable, the rule will become unpredictable to an entity that does not have the seed to the random number generator. Unpredictability can also be achieved by adding an output value of a chaotic function. Since unfriendly entities do not have the precise initial condition of the chaotic generator, they cannot predict the outcome of the rule. The left-hand-side of the following rule will evaluate to TRUE or FALSE depending on the pseudorandom or chaotic value of r1. The pseudorandom or chaotic value r2 modifies the action that is performed when the left-hand-side of the rule evaluates to TRUE.

If A−a+r1>B+b then do C+r2

If two or more entities are evaluating the same rule then the worst uncertainties are used to evaluate the rule. This is important because different entities may have different uncertainties associated with each variable. This might occur because each entity has a different point of view, different sensors, different estimators, a different noise environment, or different computational capabilities. Each Uncertainty Handler (5), numbered i, must bound the uncertainties of the other entities. Then our example rule becomes the following. This rule will evaluate the same for all the friendly entities involved.

If A−max($a_i$)+r1>B+max($b_i$) then do C+r2

Furthermore, actions can also be uncertain if they are functions of uncertain information. The following rule includes an action that is a function of an uncertain variable, X.

If A−max($a_i$)+r1>B+max($b_i$) then do C(X)+r2

The uncertainty in X is bounded by a positive number, $x_i$. The Uncertainty Handler (5) ensures a deterministic action by allowing X change only in increments of max($x_i$). Thus, a change in X of less than max($x_i$) will not change the output of C. Here, the floor function rounds a real value down to an integer value.

If A−max($a_i$)+r1>B+max($b_i$) then do C(floor(X/max($x_i$))*max($x_i$))+r2

Another way to handle uncertainty in the input variables of the rule is to add a bias. Discretization by the previous method alone might result in certain functions outputting nothing for small values of X. If this effect is not desired, a bias is added by the Uncertainty Handler (5) to the function input so that the function will provide a predictable action (rather than no action) when the variable is small. This bias may be deterministic, pseudorandom, or chaotic. The only requirement is that the bias is larger than the maximum uncertainty. Notice that the discretization of the action function, C, is hidden by r2, which makes the total action function non-discrete. Also, a non-constant and non-discrete D makes the action function C evaluate to a non-discrete value.

If A−max($a_i$)+r1>B+max($b_i$) then do C(floor(X/max($x_i$))*max($x_i$)+D)+r2

The Uncertainty Handler (5) can also include one or more behavior attractors. A behavior attractor is an algorithmic device that is a function of a random number and of precisely known information, such as the time. It attracts a system toward a behavior even in the presence of uncertain occurrences. To a second entity that knows the behavior attractors, the first entity will remain predictable even when the second entity does not have access to all the information that the first entity has to make its decisions.

Figure 5:
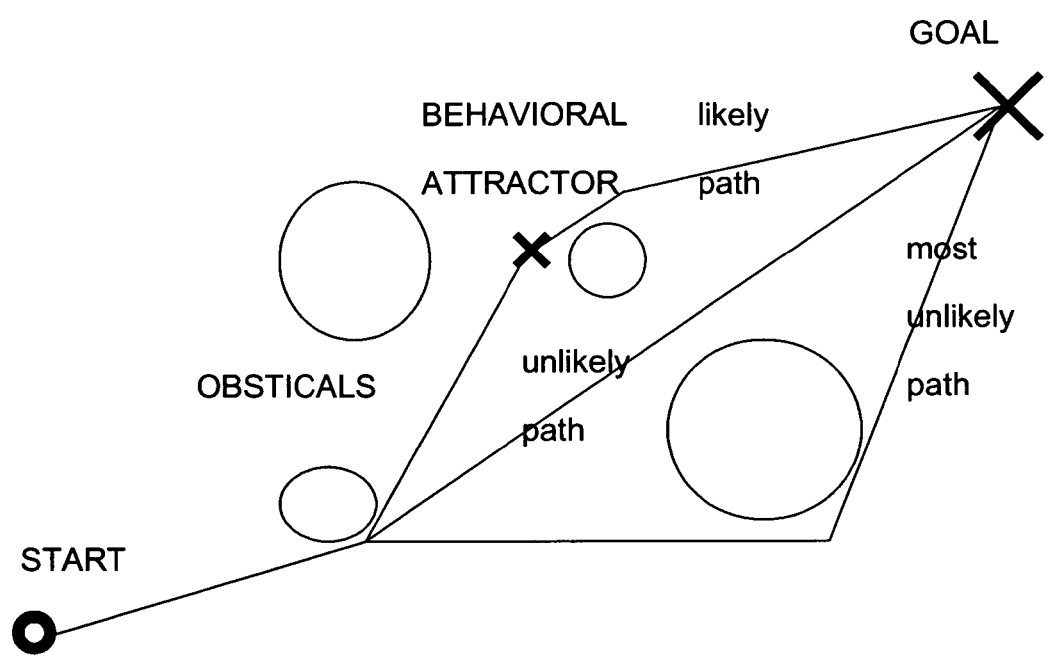
FIG. 5 shows an example of path planning using a behavioral attractor.

An example of a behavioral attractor is shown in FIG. 5. This figure represents a path-planning problem. The entity must get from the circle in the lower left hand corner to the x in the upper right hand corner by maneuvering its way through a set of obstacles. If the initial state of the first entity and all environmental information is known to a second entity then the second entity can precisely predict the path of the first entity. If a threat pops-up, the first entity might change its path. If the second entity is not aware of these pop-ups then it could predict the wrong path. To ensure statistical predictability in this case, a behavior attractor is added. This attractor appears at a pseudorandom location in space-time. The first entity will try to get as close to it as possible given the threat environment. This will make the first entity's behavior more predictable to the second entity. An opponent cannot make use of the existence of a behavior attractor to improve predictability because the attractor is pseudorandom and potentially time-varying.

A conventional analog to a behavior attractor is an extraction point. A helicopter can assume that a friendly force will be at the extraction point because the force makes every effort to get there despite the uncertainties of combat. If a friendly force needs to know where the first force is before the planned extraction, it can assume that the force will be on a path that leads to the extraction point and exclude other paths.

Behavior attractors can be used in another way if minimal communication is possible. Consider a vehicle that is attempting to remain undetected, but which must rendezvous with other assets. If the vehicle is detected, it must execute a path change to get away from the sensor and to avoid interceptors. Ordinarily, this change of path might require extensive communication to coordinate with the rendezvousing assets. Unfortunately, communication might compromise the vehicles position. However, at the moment of the vehicle's detection by the sensor, the vehicle can send a brief signal without providing the opponent with significant additional information. This signal might include an identification number, information about the sensor, and a flag noting the intention to change the path. It will not include any information about the intentions or plans of the vehicle (unless the situation is so uncertain that it cannot be described sufficiently to allow for an accurate prediction of the vehicle's position or intended actions.) Since the rendezvousing assets have access to a planner that is compatible with the one on the vehicle and they have the same key, the rendezvousing assets will continue to coordinate their plans with the vehicle. They can change their own paths to maintain a rendezvous. This rendezvous even can be achieved without setting a specific rendezvous point beforehand. Rather, the rendezvous point can "float" with time and as conditions change.

One might call the previous case an example of "contingency handling". Without cryptic planning, a series of "what-ifs" and alternate plans must be generated to account for contingencies. If a pre-considered contingency occurs during a mission, a vehicle might signal that it is changing to "plan B." The other assets can change to "plan B" to maintain coordination. If an un-considered contingency is encountered, however, the mission might be compromised. With cryptic planning, extensive preplanning to deal with a myriad of possibilities is not required. New plans are generated "on-the-fly" and all parties involved will generate compatible plans. Since the replanning occurs when each contingency occurs, every contingency can be handled. Since the process is keyed, security is maintained just as well as with the traditional approach.

Keys (2) are controlled as are keys for any other cryptographic process but the nature of this invention allows for further control with respect to crypto-nets. Each set of allies, known as a crypto-net, can receive a different set of keys. The planning or control process can be constructed to provide different levels or types of coordination and predictive capability to each crypto-net. The compromise of a key only has the potential to compromise the capabilities provided to the corresponding crypto-net. This crypto-net can be switched off without affecting the capabilities of the other crypto-nets. This switch-off is achieved by commanding other involved entities to alter their process to be inconsistent with any key generated for the compromised crypto-net. Complex arrangements of alliances can be handled by switching-on particular crypt-nets and switching-off other crypto-nets for particular cryptically controlled devices. All devices do not require the same crypto-nets switched on or off. Additionally, this switching can be coordinated with various crypto-periods to account for time-sensitive alliances.

Selective coordination is implemented by supplying each group with a unique set of coordination keys. Each group's set of keys includes a key for each possible combination of coordinating groups. In FIG. 6, each group's key labels are shown. The group number is at the top. Under each group number is a list of all the groups. Under the list of groups are rows of ones and zeros. Each row corresponds to a different case of desired coordination. A one signifies coordination and a zero signifies lack of coordination. For example, a one under the two in group one's section means that group one and group two are coordinated. A zero means that they are not coordinated. Of course, the column under the one is all ones in section one since a group must coordinate with itself. (If no coordination is desired within a logical group, the members are each assigned a unique crypto-group number.) In section two, the column under the two is all ones. In section three, the column under the three is all ones. After each row is a label representing a unique key. The key associated with this label is combined in some fashion (such as exclusive or'ed) with the global key. Notice that the corresponding case in each of the other two sections is associated with the same unique key. In this way, the desired coordination is maintained. If groups one and two wish to coordinate without allowing group three to coordinate, they use key three. Since group three does not have key three, it cannot coordinate with groups one and two. If groups one and two wish to include group three, they can switch to key two since all three groups have key two. Communication is not necessarily required when one entity switches a key because the other entities may notice the lack of coordination and can check their available keys for the one that reestablishes coordination.

The coordination keys may be loaded prior to a mission or they may be stored permanently in each crypto-device. To prevent permanently stored keys from falling into the hands of a competitor, there are a number of methods known to those skilled in the art. These methods include algorithms that assemble keys just prior to use from information dispersed to various places in memory. Another method is to protect the hardware with a tamper-resistant coating (such as flame spray) to ensure the destruction of the hardware upon tampering.

A computer simulation of cryptic control was performed to show one way that pseudorandom behavior can be applied to a system. In this example, a "master" system evades an "enemy" system by using a pseudorandom control sequence. Due to a lag in the response of the enemy, its tracking is not perfect. A predictor cannot be used to compensate for this lag since prediction is impossible in the face of so much randomness. Simultaneously, a "friendly" system is able to track the original system because it knows the random number generator that is used and it has access to the same seed. No communication between the friendly systems is required to maintain precise tracking. In this example, it is assumed that each friendly system has a way of knowing its "position" to the level of accuracy desired. Each system is linear, fourth-order, and uses the same Proportional-Integral-Derivative (PID) controller. (PID controllers are well known to those skilled in the art. See [Franklin, Powell, and Emami-Naeini, 1994].) The effective gain of the unfriendly system is significantly higher to simulate tracking specialization.

Each system has two outputs. These outputs are analogous to positions. The goal of the unfriendly system is to make its outputs match the outputs of the master system. The goal of the master system is to prevent this collision. The goal of the friendly system is to maintain a precise position relative to the master system while the master system is evading the unfriendly system.

Figure 7:
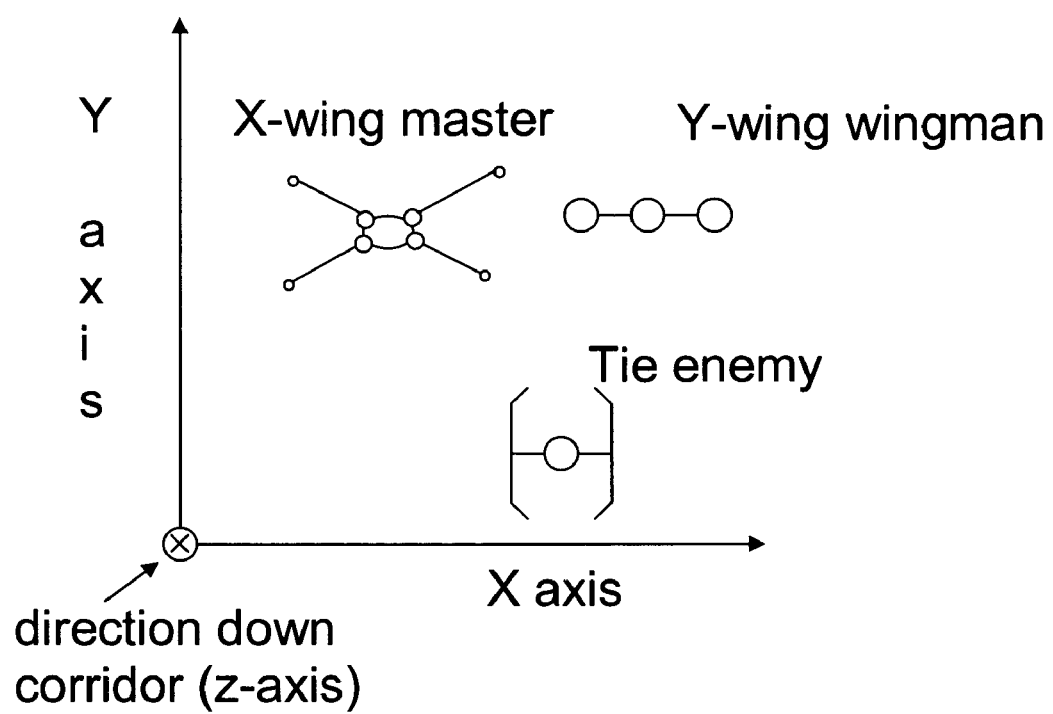
FIG. 7 shows an example of a cryptically controlled system
Figure 8:
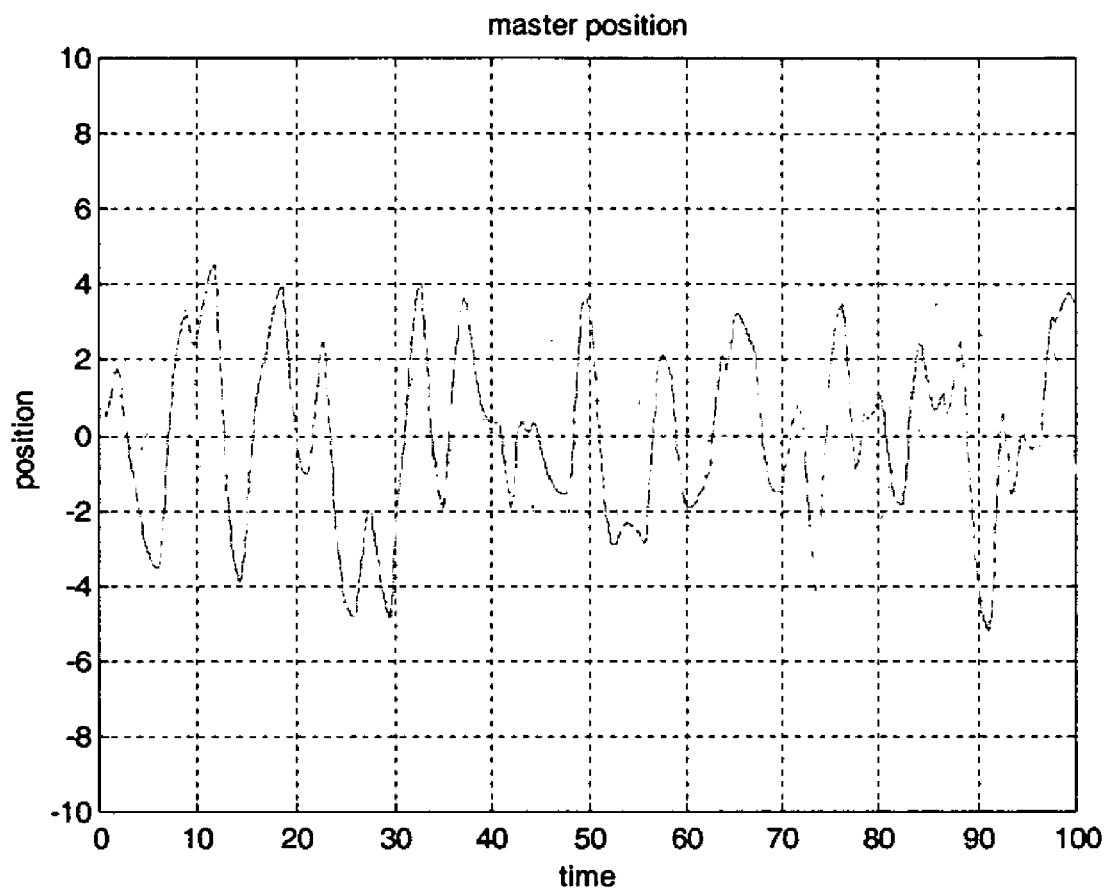
FIG. 8 shows outputs of an example system during evasion maneuvers.

The master system frequently changes its goal output according to a number chosen from a pseudorandom sequence. Note: there are no units since the system does not correspond to any real system. But, as a visual aid, one can think of this scenario as the attack on the Death Star in the first (Episode III) Start Wars movie (FIG. 7). The master system is Luke Skywalker in his X-wing fighter. The friendly system is his wingman. The enemy system is Darth Vader in this Tie fighter trying to get into a good position behind the X-wing for a shot at Luke (at x=y=0). FIG. 8 shows the outputs of the master system.

Figure 9:
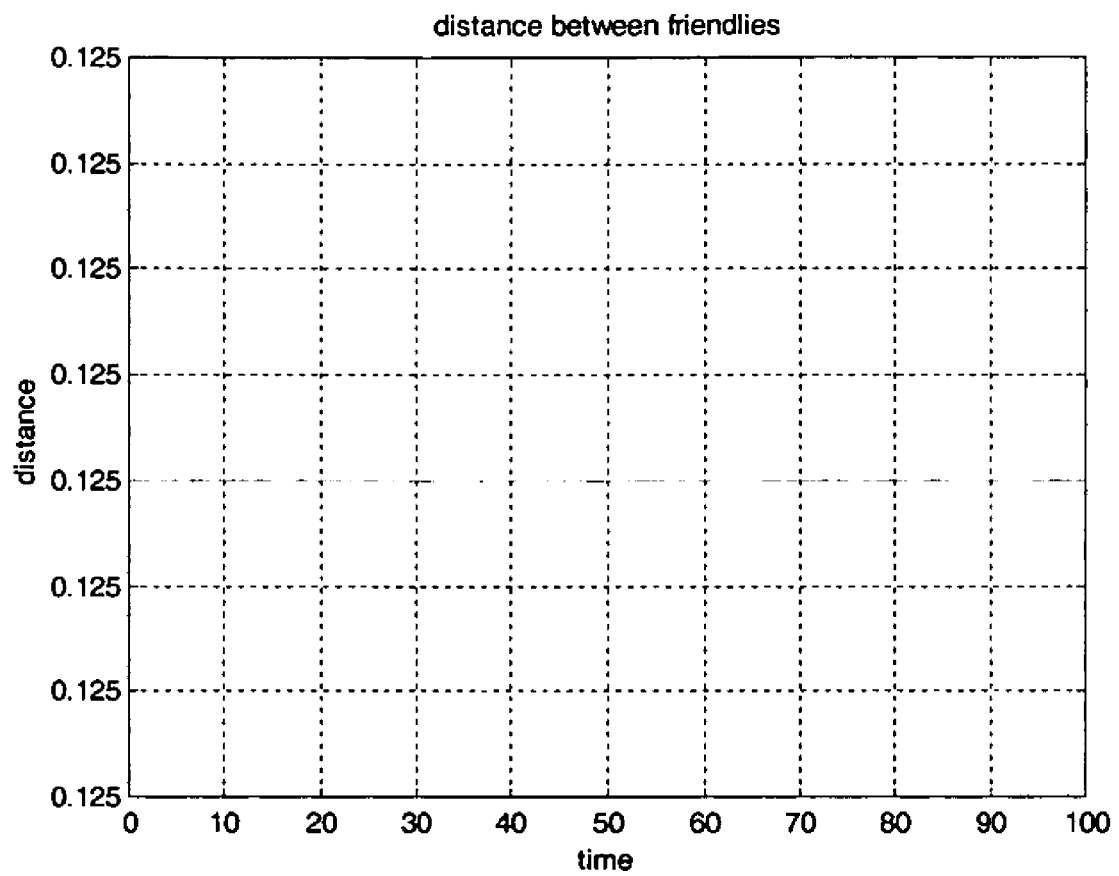
FIG. 9 shows the distance between two friendly systems during evasion maneuvers.

FIG. 9 shows that a desired distance was maintained between friendly systems despite the "jerking" motions induced by the pseudorandom control strategy. A nonzero distance was maintained since physical systems cannot occupy the same space.

Figure 10:
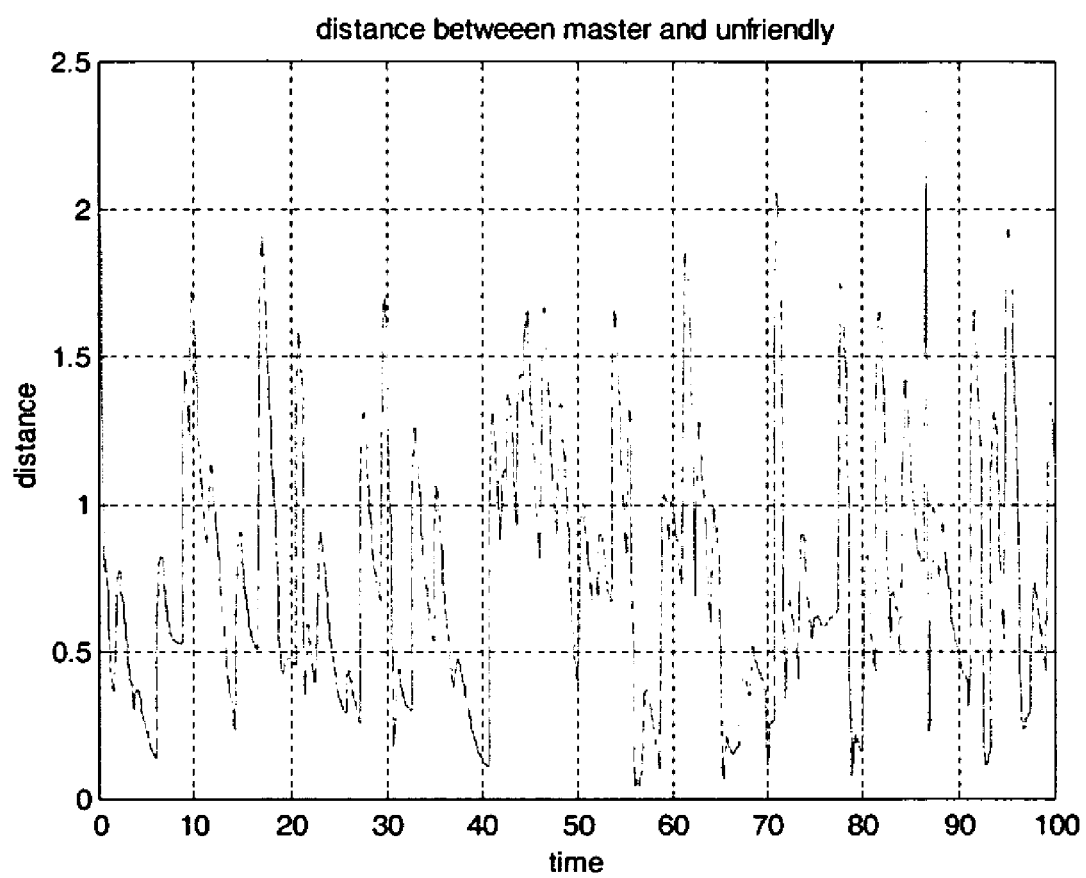
FIG. 10 shows the distance between a friendly and an unfriendly system during evasion maneuvers.

FIG. 10 shows the distance between the master system and the unfriendly system. The unfriendly system is attempting to make its position the same as the master system. In other words, the unfriendly system is attempting to hit the master system. Notice that the tracking error never goes to zero. This is because the master system is frequently changing its path. (Even Darth Vader cannot foresee a perfectly random future.)

Often, unlike the previous example, the enemy will be incapable of continuous monitoring of the friendly vehicle. This gives our approach further advantage by reducing the enemy's ability to react. With neither reactive control nor predictive control, the enemy is completely ineffectual.

A mission that uses cryptic planning is envisioned as unfolding as follows.
1. The National Security Agency (NSA) provides keys to friendly units.
2. An off-line mission planner is keyed.
3. A pseudo-random mission plan is generated off-line, including rendezvous or coordination as necessary.
4. An on-line planner for each involved unit or vehicle is keyed.
5. Each on-line planner is initialized with the off-line plan.
6. Multiple mission predictors are keyed. There is one predictor for each unit or vehicle involved in the mission.
7. The mission is launched.
8. During the mission, communication is lost, not desired, too complicated, too dangerous, or too expensive.

9. Limited sensor information is fed into each mission predictor. Each mission predictor produces uncertainty estimates of the critical information available to other involved, friendly entities.
10. The situation changes. This may be an infrequent event or may happen in a continuous fashion.
11. Each predictor will produce a new plan based upon the maximum estimates of variable uncertainty and pre-programmed behavioral attractors. This replanning compensates for the change to the situation while resulting in the maintenance of coordination.
12. Each asset follows its new plan.
13. Repeat steps 9-12 as necessary.
14. The opponent is confused by the unpredictable behavior and must respond reactively.
15. The mission is completed.

The preferred embodiment and the described variations are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

The invention claimed is:

1. A method of actuating one of a plurality of included entities to perform a specific behavioral function from a plurality of behavioral functions in such a manner that all included entities may predict the specific behavioral function to be performed by such included entity, said method comprising:
   (a) providing the one included entity with means for actuating such included entity to perform the plurality of behavioral functions;
   (b) providing a computer for each included entity, wherein:
      (i) the computer for the one included entity is programmed to communicate a plurality of commands to the means for actuating the one included entity to perform the plurality of behavioral functions, each of which commands is adapted to actuate the one included entity to perform a specific behavioral function from the plurality of functions;
      (ii) the computer for each included entity is programmed to generate a plurality of sequences of numbers, each of which sequences is determined by a specific key;
      (iii) the computer for each included entity is programmed to determine a mapping instruction;
      (iv) the computer for each included entity is programmed to select a particular number from a sequence based upon the determined mapping instruction;
      (v) the computer for each included entity is programmed to select a command based upon the particular number selected from the sequence;
   (c) providing a key to each included entity;
   (d) operating the computer of each included entity to generate a sequence of numbers determined by the key;
   (e) operating the computer of each included entity to determine the mapping instruction;
   (f) operating the computer of each included entity to select a particular number from the sequence based upon the determined mapping instruction;
   (g) operating the computer of each included entity to select a command based upon the particular number selected from the sequence;
   (h) operating the computer of the one included entity to communicate the selected command to the means for actuating the one included entity to perform the plurality of behavioral functions;
   (i) actuating the one included entity to perform the specific behavioral function determined by the command.

2. The method of claim 1 wherein the computer for each included entity is programmed to determine a mapping instruction based upon input that is selected from the group consisting of:
   (a) environmental data;
   (b) navigational data;
   (c) temporal data;
   (d) privileged information.

3. The method of claim 1:
   (a) wherein each computer for each included entity is programmed to decrypt an encrypted key;
   (b) which includes the step of providing an encrypted key to each included entity;
   (c) which includes the step of operating the computer of each included entity to decrypt the key prior to generating a sequence of numbers determined by the key.

4. The method of claim 1 wherein each computer for each included entity:
   (a) includes means for receiving data from a global positioning system;
   (b) includes a database comprising a table which matches numbers that may be generated in the sequence of numbers to positions on a map, which positions can be correlated with data from a global positioning system;
   (c) is programmed to select a particular number from a sequence based upon the correlation of data from a global positioning system to positions on a map in the database.

5. The method of claim 1 wherein each computer for each included entity:
   (a) includes means for receiving data from a global positioning system;
   (b) includes a database comprising a mathematical function which matches numbers that may be generated in the sequence of numbers to positions on a map, which positions can be correlated with data from a global positioning system;
   (c) is programmed to select a particular number from a sequence based upon the correlation of data from a global positioning system to positions on a map in the database.

6. The method of claim 1:
   (a) wherein each computer for each included entity:
      (i) has access to a clock;
      (ii) is programmed to read data from the clock;
   (b) which includes the step of operating the computer of each included entity to synchronize the clock to the same reference time.

7. The method of claim 1:
   (a) wherein each computer for each included entity:
      (i) is programmed to receive a plurality of keys;
      (ii) includes means for receiving a communication identifying a specific key from the plurality of keys;
      (iii) is programmed to select a specific key from the plurality of keys based upon the communication received;
   (b) which includes the steps of:
      (i) providing a plurality of keys to each included entity;
      (ii) transmitting a communication to at least the one included entity, which communication identifies a specific key from the plurality of keys;

(iii) operating the computer of each included entity which has received the communication to select a key from the plurality of keys;
(iv) operating the computer of each included entity which has received the communication to generate a sequence of numbers determined by the selected key;
(v) operating the computer of each included entity which has received the communication to determine the mapping instruction;
(vi) operating the computer of each included entity which has received the communication to select a particular number from the sequence based upon the determined mapping instruction;
(vii) operating the computer of each included entity which has received the communication to select a command based upon the particular number selected from the sequence;
(viii) operating the computer of the one included entity to communicate the selected command to the means for actuating the one included entity to perform the plurality of behavioral functions;
(ix) actuating the one included entity to perform the specific behavioral function determined by the command.

8. A method of actuating one of a plurality of included entities to perform a specific behavioral function from a plurality of behavioral functions in such a manner that all included entities may predict the specific behavioral function to be performed by such included entity, said method comprising:
(a) providing the one included entity with means for actuating such included entity to perform the plurality of behavioral functions;
(b) providing a computer for each included entity, wherein:
(i) the computer for the one included entity is programmed to communicate a plurality of commands to the means for actuating the one included entity to perform the plurality of behavioral functions, each of which commands is adapted to actuate the one included entity to perform a specific behavioral function from the plurality of functions;
(ii) the computer for each included entity is programmed to receive a sequence of numbers;
(iii) the computer for each included entity is programmed to determine a mapping instruction;
(iv) the computer for each included entity is programmed to select a particular number from a sequence based upon the determined mapping instruction;
(v) the computer for each included entity is programmed to select a command based upon the particular number selected from the sequence;
(c) providing the computer of each included entity with a sequence of numbers;
(d) operating the computer of each included entity to determine the mapping instruction;
(e) operating the computer of each included entity to select a particular number from the sequence based upon the determined mapping instruction;
(f) operating the computer of each included entity to select a command based upon the particular number selected from the sequence;
(g) operating the computer of the one included entity to communicate the selected command to the means for actuating the one included entity to perform the plurality of behavioral functions;
(h) actuating the one included entity to perform the specific behavioral function determined by the command.

9. The method of claim 8 wherein the computer for each included entity is programmed to determine a mapping instruction based upon input that is selected from the group consisting of:
(a) environmental data;
(b) navigational data;
(c) temporal data;
(d) privileged information.

10. The method of claim 8:
(a) wherein the computer for each included entity is programmed to decrypt an encrypted sequence of numbers;
(b) which includes the step of providing an encrypted sequence of numbers to each included entity;
(c) which includes the step of operating the computer of each included entity to decrypt the encrypted sequence of numbers.

11. The method of claim 8:
(a) wherein each computer for each included entity:
(i) includes means for receiving data from a global positioning system;
(ii) includes a database comprising a table which matches numbers that may be generated in the sequence of numbers to positions on a map, which positions can be correlated with data from a global positioning system;
(iii) is programmed to select a particular number from a sequence based upon the correlation of data from a global positioning system to positions on a map in the database.

12. The method of claim 8:
(a) wherein each computer for each included entity:
(i) has access to a clock;
(ii) is programmed to read data from the clock;
(b) which includes the step of operating the computer of each included entity to synchronize the clock to the same reference time.

13. The method of claim 8:
(a) wherein each computer for each included entity:
(i) is programmed to receive a plurality of sequences of numbers;
(ii) includes means for receiving a communication identifying a specific sequence of numbers from the plurality of sequences of numbers;
(iii) is programmed to select a specific sequence of numbers from the plurality of sequences of numbers based upon the communication received;
(b) which includes the steps of:
(i) providing a plurality of sequences of numbers to each included entity;
(ii) transmitting a communication to at least the one included entity, which communication identifies a specific sequence of numbers from the plurality of sequences of numbers;
(iii) operating the computer of each included entity which has received the communication to select a sequence of numbers from the plurality of sequences of numbers;
(iv) operating the computer of each included entity which has received the communication to determine the mapping instruction;
(v) operating the computer of each included entity which has received the communication to select a particular number from the selected sequence based upon the determined mapping instruction;

(vi) operating the computer of each included entity which has received the communication to select a command based upon the particular number selected from the selected sequence;

(vii) operating the computer of the one included entity to communicate the selected command to the means for actuating the one included entity to perform the plurality of behavioral functions;

(viii) actuating the one included entity to perform the specific behavioral function determined by the command.

\* \* \* \* \*